Jan. 16, 1940. A. RYDQUIST Re. 21,327

MOUNTING FOR GRIP CORDS

Original Filed July 3, 1935 2 Sheets-Sheet 1

INVENTOR
Adolph Rydquist
BY Edward H. Rumpton
his ATTORNEY

Jan. 16, 1940. A. RYDQUIST Re. 21,327

MOUNTING FOR GRIP CORDS

Original Filed July 3, 1935 2 Sheets-Sheet 2

INVENTOR
Adolph Rydquist
BY Edward F. Crumpton
his ATTORNEY

Reissued Jan. 16, 1940

Re. 21,327

UNITED STATES PATENT OFFICE 21,327

MOUNTING FOR GRIP CORDS

Adolph Rydquist, Rochester, N. Y., assignor to The Schlegel Manufacturing Company, Rochester, N. Y., a corporation of New York Original No. 2,076,417, dated April 6, 1937, Serial No. 29,746, July 3, 1935. Application for reissue September 29, 1938, Serial No. 232,463

25 Claims. (Cl. 24—123)

This invention relates to mountings for grip cords, of the kind used in vehicles, or similar places, and has for its principal object, the provision of a mounting for grip cords, straps, cables, or the like, which is simple in construction, attractive in appearance, economical to make and which is not liable to become dislocated when in use.

More specifically the object of the invention is the provision of a mounting for a grip cord comprising a base plate adapted to be secured to a support and to which the grip cord may be detachably connected. A shield or housing for the end of the grip cord is also detachably mounted on said base plate and serves to secure the grip cord thereto.

To these and other ends the invention resides in certain improvements and combinations of parts, all as will be hereinafter more fully described, the novel features being pointed out in the claims at the end of the specification.

Figure 15:
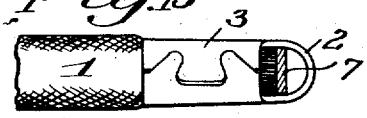
Fig. 15 is a plan view of one end of a grip cord.

Referring particularly to the drawings in which like reference numerals refer to the same part throughout the several views, 1 is a cord or strap of any usual or preferred construction, several forms being illustrated in the drawings. For purposes of illustration, the one shown in the drawings is similar to that disclosed in my pending application for patent for grip cord and method of making same, Serial No. 3,603, filed January 26, 1935. One or both ends of the cord may be provided with an eyelet or loop 2 as shown in Fig. 15, whereby it may be secured or attached to a suitable support or mount. In the form illustrated, the eyelet 2 is formed integral with a ferrule 3, in which the end of the cord is secured.

Figure 5:
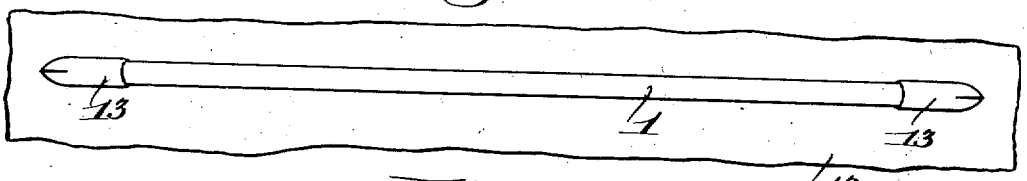
Figs. 5 and 6 are a front elevation and plan view, respectively, of a robe rail or clothes hanger illustrating still another application of the invention.
Figure 6:
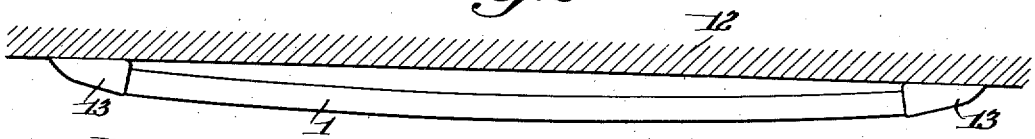
Figures 1, 2, 3, 4:
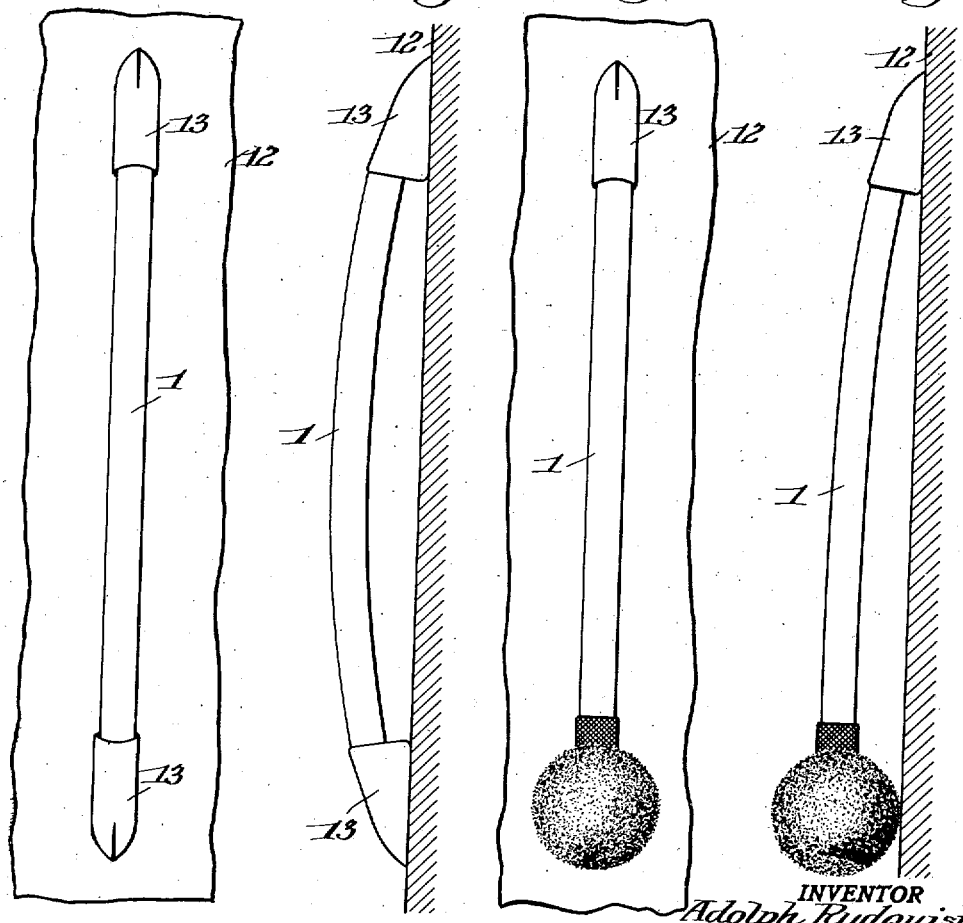
Figs. 1 and 2 are front and side elevations respectively, of a grip cord illustrating one possible application of the invention.
Figs. 3 and 4 are front and side elevations, respectively, of a suspended grip cord illustrating another application of the invention.
Figure 8:
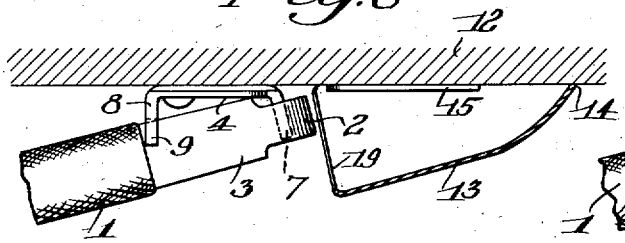
Fig. 8 is a similar view showing the housing detached and sectioned away to expose its interior.
Figure 7:
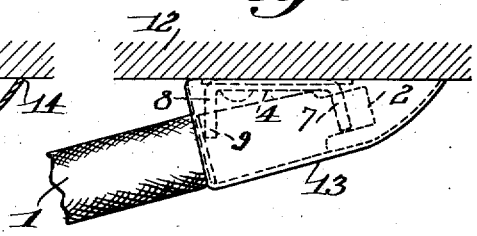
Fig. 7 is a side view of the mounting somewhat enlarged, the cord being broken away to conserve space.
Figure 10:
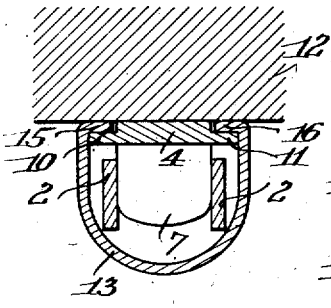
Fig. 10 is a transverse section thereof taken substantially on line 10—10 of Fig. 9 and looking in the direction of the arrows at said line.
Figure 9:
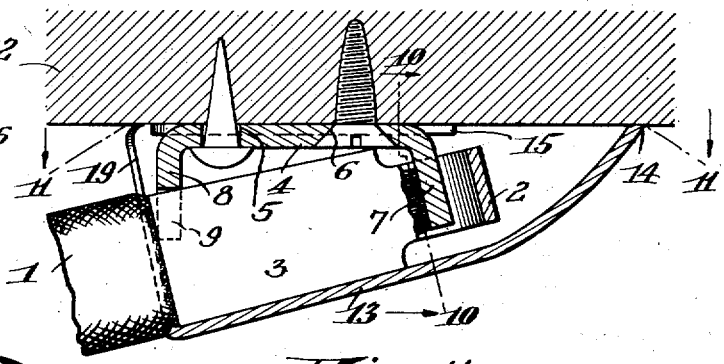
Fig. 9 is an enlarged longitudinal sectional view of the cord mount.
Figure 12:
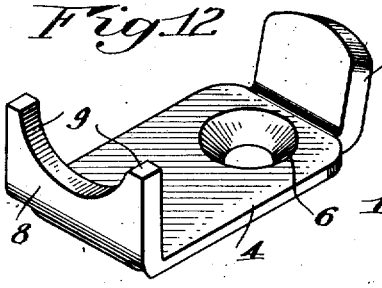
Fig. 12 is a perspective view of the upper face of the base plate.
Figure 11:
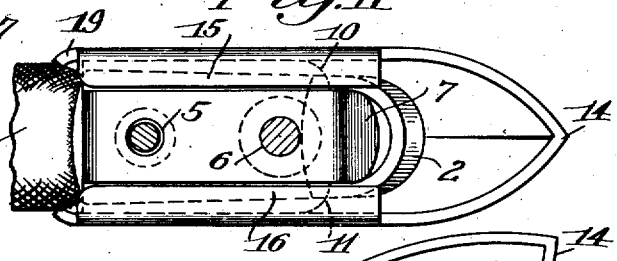
Fig. 11 is an inverted plan view of the mount, the securing means being sectioned away substantially on line 11—11 of Fig. 9.
Figure 13:
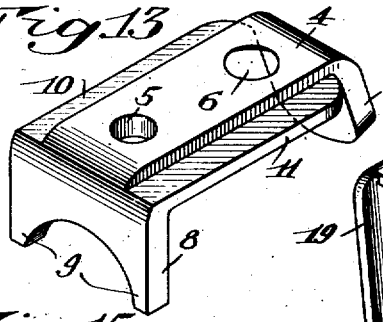
Fig. 13 is a perspective view of the lower face of the base plate.

To secure the end of the grip cord to a support, a member or base plate, generally referred to by the reference numeral 4 and illustrated in detail in Figs. 12 and 13, is provided with one or more openings 5 and 6, whereby it may be secured to a convenient support by means of screws or nails or other preferred means. In the illustrated embodiment, the opening 6 is arranged to receive a flat headed wood screw of usual form and the opening 5, a nail to secure the plate from turning on the screw as a pivot. The base plate 4 is substantially rectangular in form and at one end is provided with a lug or flange 7 with which the eyelet 2 at the end of the cord is adapted to engage. The lug 7 inclines upwardly and outwardly from the upper face of the base plate, so that a pull on the cord tends to move the end portion of the loop of the ferrule toward the base plate. A second flange 8 projects upwardly from the opposite end of the base plate which is recessed to receive the ferrule, the arms 9 of the flange extending on opposite sides of the ferrule and serving to hold it against lateral displacement in opposite directions. The ferrule is anchored against pivotal movement on the base plate through engagement of the lug 7 with the side walls of the loop 2 of the ferrule as shown in Fig. 10.

Figure 14:
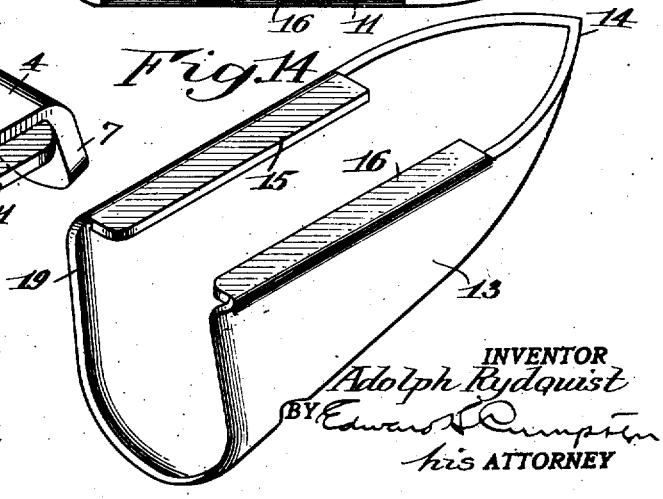
Fig. 14 is a perspective view of the shield or casing.

On its lower face, the side edges of the base plate are cut away to form a pair of substantially parallel recesses or guideways 10 and 11 between the side edges of the base plate and the support 12 on which it is mounted. Mounted on said base plate and resiliently engaging said guideways is a retaining member or shield 13 which also serves as a housing for the end of the cord to conceal the ferrule and eyelet thereon. The retaining member 13 is substantially of the form shown in Fig. 14 of the drawings and is constructed of resilient sheet material, such as brass. It has a curved or rounded upper surface terminating in a point 14 at one end, the side walls curving outwardly and rearwardly from said point for a short distance and then continue rearwardly in substantially parallel relation. The parallel portions of the side walls are provided with inwardly projecting flanges 15 and 16 which are adapted to engage the guideways 10 and 11 of the base plate. The end of the retaining member opposite the point 14 is open to provide a clearance for the cord. In order to insure a frictional engagement between the retaining member and the base plate, the distance between the side walls of the retaining member may be slightly less than the width of the base plate, so that the side edges of the base plate are resiliently engaged between the side walls of the retaining member, whereby the retaining member is frictionally secured thereon.

To secure the end of the cord to the support 12, the base plate 4 is first secured thereto. The eyelet 2 on the end of the cord is then engaged with the lug 7 and the cord arranged between the arms 9 on the flange 8. The shield is then seated on the base plate by a sliding movement with its flanges 15 and 16 engaged with the guideways 10 and 11. The material of the retaining member, at its inner end, substantially surrounds the opening therein and is preferably bent, as shown in the drawings to form an inwardly directed flange 19 adapted to resiliently engage the periphery of the cord adjacent the point where the latter engages the flange 8 on the base. The inter-engaging members 7 and 2 are preferably of a size and shape to cooperate in a manner to prevent turning of the ferrule about the axis of the cord. The shield closely overlies the ferrule and serves to retain it in position upon the base plate.

A mount for a grip cord thus constructed, is neat in appearance, since all securing parts are concealed. It is simple and inexpensive to make and may be mounted without the employment of skilled workmen. After the base plate is mounted in position the cord may be attached thereto without the use of special tools and when the cord becomes soiled or worn it may be readily replaced with a clean or new one without the use of tools or detachment of the base plate on which the cord is anchored.

Although I have shown and described herein only one possible embodiment of the invention, it will be understood that this application is intended to cover all such changes or modifications as come within the spirit of the invention or the scope of the following claims.

I claim:

1. A mount for a cord having a recessed ferrule thereon, said mount comprising a base plate having spaced upstanding parts one for detachably engaging the ferrule within said recess and another forming a seat for the cord, a retainer cooperating with the base plate for securing the cord thereon, and means for detachably mounting said retainer on the base plate.

2. A mount for a cord having securing means thereon, said mount comprising a base plate having an opening for the insertion of means for connecting the plate with a support, means on said base plate for attaching said securing means thereto, a recessed seat on the base plate for the cord, and retaining means for detachably securing the cord in said seat against lateral movement in one direction on the base plate, said retaining means being detachable independently of the means for connecting the base plate with the support.

3. A mount for a cord comprising a base plate, means at one end of said plate for attaching a cord thereto, a seat for the cord at the opposite end of said plate, said seat being formed to engage the cord and anchor it against lateral movement in opposite directions on the plate, and detachable means on the base plate for holding the cord against outward displacement thereon.

4. A mount for a cord comprising a base plate, a lug at one end of said plate projecting upwardly therefrom and adapted to have a cord attached thereto, a seat for the cord at the opposite end of said plate, and means for retaining the cord in its seat and attached to said lug.

5. A mount for a cord comprising a base plate, means on said base plate for attaching a cord thereto, a seat for the cord projecting from the base plate, a retainer detachably mounted on said base plate for retaining the cord attached thereto, and means on the retainer for engaging the cord at points opposite and adjacent said seat for retaining the cord rigidly therein.

6. A mount for a cord comprising a base plate, means on said base plate for attaching a cord thereto, a pair of guideways on said base plate, and a retainer detachably mounted in said guideways for retaining the cord on said base plate.

7. A mount for a cord comprising a base plate, a seat on said base for a cord, a pair of guideways on said base plate, a retainer mounted in said guideways and frictionally retained therein, and means on said retainer for resiliently engaging the cord with said seat.

8. A mount for a cord comprising a base plate, means on said base plate for attaching a cord thereto, guideways on said base plate, a retainer, and flanges on said retainer slidably engaging said guideways and resiliently retained thereon.

9. A mount for a cord comprising a base plate, means on said base plate for attaching a cord thereto, a seat for the cord projecting from the base plate, guideways on said base plate, and a retaining member detachably mounted in said guideways.

10. A mounting for a cord comprising a member for attachment to a support in association with a portion of said cord, parts for securing said member to the support, a housing for said member and cord portion, and cooperating parts on said member and housing for detachably securing said housing to said member over said cord portion independently of the securing parts of said member.

11. A mounting for a cord comprising a base member for attachment to a support in association with a portion of said cord, a housing member for said base member and cord portion, and recess means on one of said members and projecting means on the other of said members for securing said housing member to said base member over said cord portion.

12. A mount for a cord having securing means thereon, said mount comprising a base plate having an opening for the insertion of means for connecting the plate with a support, means on said base plate for attaching said securing means thereto, a recessed seat on the base plate for the cord, and retaining means for detachably securing the cord in said seat against lateral movement in one direction on the base plate, said retaining means being detachable independently of the means for connecting the base plate with the support.

13. A mount for an elongated hand grip having a recess formed in one end thereof, said mount comprising a base plate having a body portion adapted for attachment to a support, said body portion having upstanding spaced parts one for engaging the hand grip within the recess thereof to connect the hand grip with the base plate, and another of said parts forming a seat for engaging the hand grip between its ends to form a support for the hand grip, and means detachably connected with the base plate for securing the hand grip thereon.

14. A mount for an elongated hand grip having a recess formed in one end thereof, said mount comprising a base plate having a body portion adapted for attachment to a support, said body portion having upstanding spaced parts one for engaging the hand grip within the recess thereof to connect the hand grip with the base plate and another of said parts being adapted to engage the hand grip between its ends and to support the recessed end of the hand grip in oblique relation to the body portion of the base plate.

15. A mount for an elongated hand grip having a recess formed in one end thereof, said mount comprising a base plate having a body portion adapted for attachment to a support, said body portion having upstanding spaced parts, one for engaging the hand grip within the recess thereof to connect the hand grip with the base plate and another of said parts forming a seat for engaging and supporting the hand grip between the ends thereof, said base plate having oppositely disposed parts forming means for guiding and securing a member insertable on the base plate for retaining the hand grip thereon.

16. A mount for a cord comprising a recessed ferrule for receiving and supporting the cord, a base plate for attachment to a support having a body portion provided with spaced upstanding parts one engaging the ferrule within said recess and another forming a seat for the ferrule, and a device detachably connected with the base plate and serving to secure the ferrule upon the base plate, said ferrule being detachably connected with the base plate and released for removal therefrom upon removing said device from the base plate.

17. A mount for a cord comprising a ferrule for receiving and supporting the cord, a base plate for attachment to a support, said plate having a body portion provided with spaced upstanding parts one engaging the ferrule and connecting it with the base plate, and another forming a seat for the ferrule, and a device forming a housing for the base plate and the ferrule and detachably connected with the base plate and serving to retain the ferrule upon the base plate.

18. A cord-anchoring installation comprising, in combination, a supporting structure, an attaching plate directly secured to said supporting structure, a means associated with said plate whereby a cord is secured thereto, and a slidable hollow shield fitted to said plate and adapted to conceal at least a portion of said plate, said shield and said plate having interengaging means whereby said shield is attached to or detached from said plate by a predetermined longitudinal motion while said attaching plate and cord are attached to said supporting structure.

19. A cord-anchoring installation comprising in combination, a supporting structure, an attaching plate, fasteners securing said attaching plate in fixed position on said structure, a cord attached directly to said attaching plate and a slidable hollow shield fitted to said plate and adapted to conceal from view at least a portion of said plate, said shield and said plate having interengaging means whereby said shield is attached to or detached from said plate by a predetermined longitudinal motion while said attaching plate and cord are attached to said supporting structure.

20. A cord-anchoring means for securing a cord to a support comprising, in combination, an attaching plate adapted to be secured directly to a support, said attaching plate having lateral shoulders on opposite edges and a slidable hollow shield having inwardly turned flanges adapted to be engaged beneath the lateral shoulders of said attaching plate by a predetermined longitudinal motion after said attaching plate has been attached to the support.

21. A cord-anchoring means for securing a cord to a support comprising, in combination, an attaching plate having at least one aperture for receiving an attaching member whereby said plate may be adapted to be secured directly to a support, said attaching plate having integral lateral shoulders on opposite edges and a slidable hollow shield formed from a single piece of metal and having integral inwardly turned flanges adapted to be engaged beneath the lateral shoulders of said attaching plate by a predetermined longitudinal motion after said attaching plate has been attached to the support and the entire attaching plate being adapted to be concealed by said hollow shield.

22. A cord-anchoring means for securing a cord to a support comprising, in combination, an apertured attaching plate adapted to be attached to said support by attaching means passing through at least one aperture, said attaching plate having integral lateral shoulders on opposite edges and a slidable hollow shield having integral inwardly turned flanges adapted to be engaged beneath the lateral shoulders of said attaching plate by a predetermined longitudinal motion after said attaching plate has been attached to the support, said shield being shaped and arranged to conceal the attaching plate, attaching means and cooperating flanges.

23. A mount of the character described comprising, in combination, a base plate, attaching means for securing the base plate to a support, means on said base plate for attaching a cord thereto, a housing member, means for securing the housing member to the base plate independently of said attaching means and in a position such that the cord is retained on the base plate at least partly by the housing member, said housing member being of such size and shape as substantially to cover the end of the cord, the base plate and the attaching means therefor.

24. A mount of the character described comprising, in combination, a base plate having a lug, attaching means for securing the base plate to a support, said lug having a free end projecting from the base plate, a cord having a loop at its end, said loop extending over the free end of the lug and being freely removable therefrom, a housing member, means for securing the housing member to the base plate independently of said attaching means and in a position such that the cord is retained on the base plate at least partly by the housing member, said housing member being of such size and shape as substantially to cover the end of the cord, the base plate, and the attaching means therefor.

25. A mount of the character described comprising, in combination, a base plate having a lug, attaching means for securing the base plate to a support, said lug having a free end projecting from the base plate, a cord having a loop at its end, said loop extending over the free end of the lug and being freely removable therefrom, a removable shell-like housing member of such size and shape as substantially to cover the end of the cord, the base plate, and the attaching means therefor, said housing member being secured to the base plate and the wall of said housing being in such proximity to the free end of the lug that the cord is retained on the lug by the housing.

ADOLPH RYDQUIST.